United States Patent [19]

Ashiba

[11] Patent Number: 5,064,032
[45] Date of Patent: Nov. 12, 1991

[54] DAMPING FORCE ADJUSTING HYDRAULIC SHOCK ABSORBER

[75] Inventor: Masahiro Ashiba, Kanagawa, Japan

[73] Assignee: Tokico Ltd., Kanagawa, Japan

[21] Appl. No.: 496,205

[22] Filed: Mar. 2, 1990

[30] Foreign Application Priority Data

Apr. 20, 1989 [JP] Japan .................. 1-100982

[51] Int. Cl.⁵ .............................. F16F 9/46
[52] U.S. Cl. .................... 188/299; 137/630.14; 188/319; 188/322.14; 188/322.15; 251/30.04
[58] Field of Search ......... 188/285, 299, 319, 322.13, 188/322.14, 322.15; 137/630.14, 614.18; 251/30.04

[56] References Cited

U.S. PATENT DOCUMENTS

| 1,807,970 | 6/1931 | Davis | 137/630.14 |
| 2,592,656 | 4/1952 | Catranis | 188/299 |
| 3,154,285 | 10/1964 | Houle | 251/30.14 |
| 4,821,851 | 4/1989 | Kruckemeier et al. | 188/299 X |

FOREIGN PATENT DOCUMENTS

| 0186167 | 7/1986 | European Pat. Off. | |
| 910494 | 5/1954 | Fed. Rep. of Germany | 188/322.14 |
| 3518327 | 11/1986 | Fed. Rep. of Germany | 188/299 |
| 3605182 | 8/1987 | Fed. Rep. of Germany | 188/319 |
| 59-22359 | 7/1984 | Japan | |
| 60-37477 | 11/1985 | Japan | |
| 61-1729 | 1/1986 | Japan | |
| 2147683 | 5/1985 | United Kingdom | |
| 2168455 | 6/1986 | United Kingdom | |

Primary Examiner—George E. A. Halvosa
Attorney, Agent, or Firm—Wenderoth, Lind & Ponack

[57] ABSTRACT

A hydraulic shock absorber includes a damping force regulating valve constructed of a plurality of valve bodies for opening and closing one of passages connecting two chambers, a spring member provided on each valve body for biasing the valve body onto a valve seat, a plunger mounted on the valve bodies, and a solenoid into which the plunger extends for moving the plunger under a force corresponding to the value of the current fed to the solenoid to successively move the valve bodies. The passage is able to be opened and closed by controlling the current value so that a damping force is generated by controlling a flow of the hydraulic fluid in the passages, thus allowing the shock absorber to exhibit a plurality of damping force characteristics.

5 Claims, 5 Drawing Sheets

DAMPING FORCE ADJUSTING HYDRAULIC SHOCK ABSORBER

BACKGROUND OF THE INVENTION

1. Field of the Invention

The present invention relates to a hydraulic shock absorber for use in a car or the like for adjusting a damping force according to a road condition at the time of driving.

2. Description of the Prior Art

Effective adjustment of a damping force for optimum comfort and steering stability according to road conditions has been proposed hitherto for hydraulic shock absorbers used in cars or the like.

There has been proposed, for example, a hydraulic shock absorber (as disclosed in Japanese Utility Model Unexamined Publication No. 61-1729, for example) wherein a bypass is formed within a piston rod through which two chambers in a cylinder partitioned by a piston communicate with each other, and a plurality of orifices are provided halfway along the bypass. The orifices are opened and closed by an externally driven shutter, whereby damping force characteristics are thus modified.

Also proposed is a hydraulic shock absorber (as disclosed in Japanese Utility Model Examined Publication No. 59-22359, Japanese Utility Model Examined Publication No. 60-37477, for example) wherein two partitioned chambers are kept in communication through a plurality of passages, a damping force generating mechanism (such as an orifice or the like) is provided for generating a damping force by controlling a flow of hydraulic fluid generated in the passages during a sliding motion of a piston in a cylinder, and the damping force is adjusted by opening and closing the passages by the use of a solenoid valve.

In a hydraulic shock absorber for adjusting a damping force by the selective operation of a plurality of orifices according to the operation of a shutter, more than two damping forces can be effectively selected and therefore, a high degree of control is realizable in response to road conditions and other factors. However, in the case of adjusting a damping force by the operation of a solenoid valve, only two damping forces may be selected and therefore, a damping force precisely corresponding to road conditions and other factors is not obtainable.

SUMMARY OF THE INVENTION

The invention has been carried out in view of the aforementioned problem, and its object is to provide a hydraulic shock absorber capable of selectively generating more than two damping forces under the operation of a solenoid valve.

In a damping force adjusting hydraulic shock absorber wherein two partitioned chambers are kept in communication through a plurality of passages, a damping force generating mechanism is provided for generating a damping force by controlling a flow of hydraulic fluid generated in the passages with the sliding motion of a piston in a cylinder. The damping force is adjustable by selectively controlling the opening or closing of one of the passages. The invention provides a damping force regulating valve for opening and closing one of the passages, comprising:

a plurality of valve bodies for seating on and separating from a valve seat provided within the one of the passages to open and close the passage;

a spring member provided on each valve body for biasing each valve body toward the valve seat;

a plunger made of a magnetic material which is mounted on the valve bodies; and a solenoid, into which the plunger extends, for successively operating the valve bodies by moving the plunger with a degree of force corresponding to the value of a current supplied thereto.

According to the aforementioned construction, when the value of a current supplied to the solenoid is low, the plunger is moved by a small force. Therefore, the valve body held on the valve seat by one small spring member can be lifted from the valve seat against the biasing force of the one spring member. And, when the value of a current supplied to the solenoid is large, the plunger is moved by a large force. Therefore, the valve body held on the valve seat by another spring member can also be lifted from the valve seat against the biasing force of the another spring member. Thus, the opening and closing of the passages may be regulated by controlling the current fed to the solenoid. And, since a damping force is generated by controlling a flow of the hydraulic fluid in the passages with the movement of the valve bodies, a plurality of damping forces is obtainable.

DETAILED DESCRIPTION OF PREFERRED EMBODIMENTS

Figure 1:
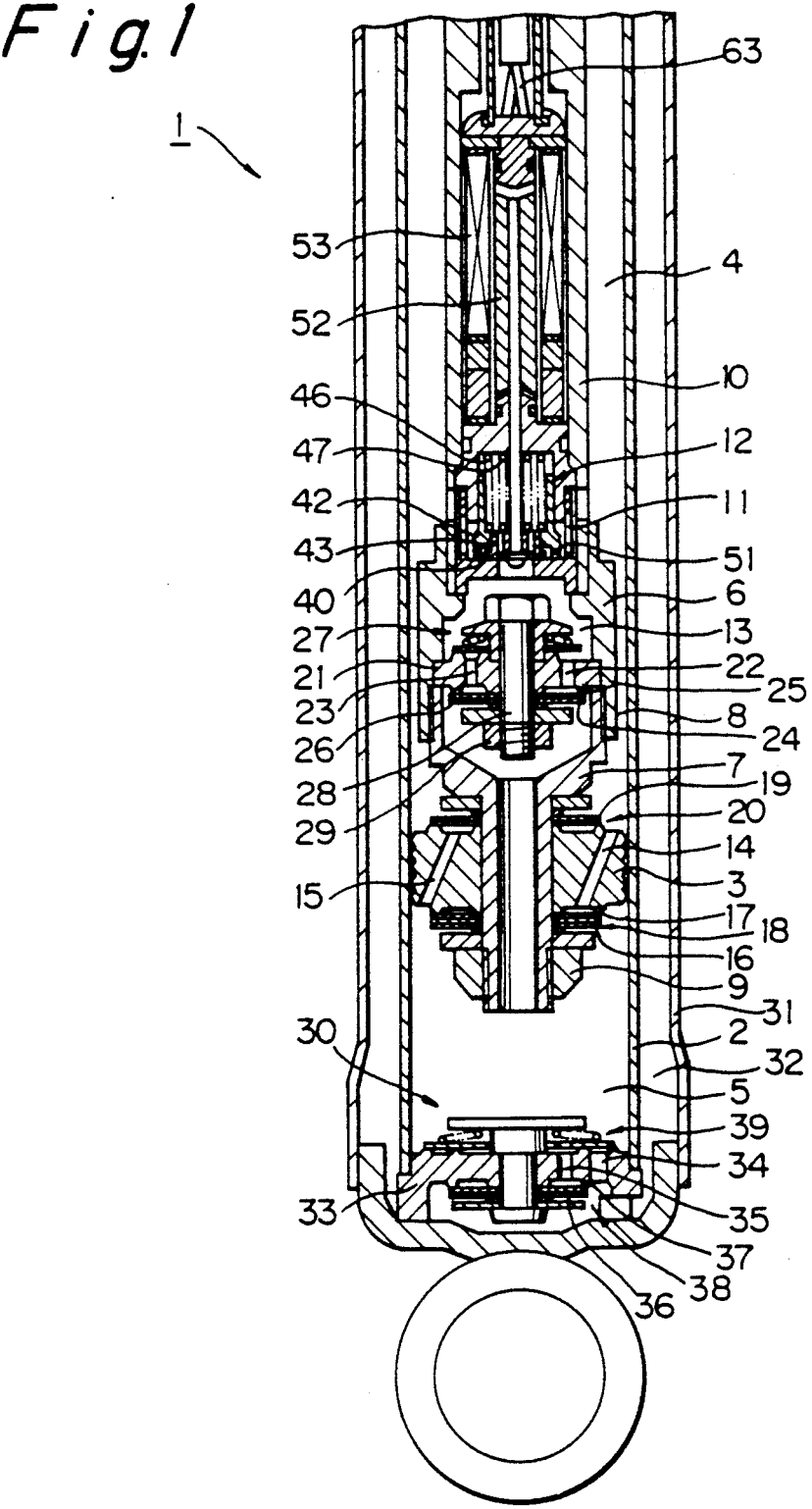
FIG. 1 is a longitudinal sectional view of a first embodiment of a hydraulic shock absorber according to the present invention.

Referring now to the first embodiment shown in FIG. 1, the hydraulic shock absorber 1 is a double-cylinder type in which a piston 3 is fitted slidably in an inner cylinder 2, and the inner cylinder 2 is partitioned by the piston 3 into an upper chamber 4 on the upper side in the drawing and a lower chamber 5 on the lower side. The piston 3 is mounted on an outer periphery of a passage member 8 consisting of a large-sized cylinder 6 and a small-sized cylinder 7 screwed thereon by means of a nut 9, and the large-sized cylinder 6 of the passage member 8 is screwed on one end of a piston rod 10. The other end (not shown) of the piston rod 10 projects to the outside of the cylinders. A passage 11 for keeping the interior of the passage member 8 and the upper chamber 4 in communication with each other is formed in the piston rod 10, and the degree of opening of the passage 11 is controlled by a damping force regulating valve 12 which will be described hereinafter. A bypass 13 for keeping the upper chamber 4 and the lower chamber 5 in communication with each other is constituted by the interior of the passage member 8 and the passage 11 of the piston rod 10.

A first expansion side passage 14 and a first compression side passage 15 for keeping the upper chamber 4 and the lower chamber 5 in communication with each other are formed through the piston 3. A first expansion side damping force generating mechanism 18 consisting of a disk valve 16 and an orifice passage 17 for generating a damping force by controlling a flow of hydraulic fluid generated at the time of an expansion stroke of the hydraulic shock absorber 1 is provided on the lower chamber 5 side of the first expansion side passage 14. And, a first compression side damping force generating mechanism 20 consisting of a disk valve 19 for generating a damping force by controlling a flow of hydraulic fluid generated at the time of a compression stroke is provided on the upper chamber 4 side of the first compression side passage 15.

An annular member 21 for closing the bypass 13 is fitted in the passage member 8, and a second expansion side passage 22 and a second compression side passage 23 for keeping the interiors of the large-sized cylinder 6 and the small-sized cylinder 7 in communication with each other are formed through the annular member 21. A second expansion side damping force generating mechanism 26 consisting of a disk valve 24 and an orifice passage 25 for generating a damping force by controlling a flow of hydraulic fluid generated at the time of the expansion stroke is provided on the interior side of the small-sized cylinder 7 of the second expansion side passage 22, and a check valve 27 for allowing hydraulic fluid to flow from the interior of the small-sized cylinder 7 to the interior of the large-sized cylinder 6 and restricting a flow of the hydraulic fluid in the counter-direction is provided on the inside of the large-sized cylinder 6 over the second compression side passage 23. The disk valve 24 of the second expansion side damping force generating mechanism 26 is set to open when a pressure is exerted thereon which is smaller than that required to open the disk valve 16. The second expansion side damping force generating mechanism 26 and the check valve 27 are mounted on the annular member 21 with a bolt 28 and a nut 29.

A body part mechanism 30 for generating a damping force at the time of a compression stroke is provided on the bottom side (lower side in the drawing) of the inner cylinder 2. The body part mechanism 30 comprises a partition member 33 for keeping the interior of the inner cylinder 2 from communicating with an annular space 32 between the inner cylinder 2 and an outer cylinder 31, a third expansion side passage 34 and a third compression side passage 35 formed through the partition member 33, a second compression side damping force generating mechanism 38 provided on the lower side of the third compression side passage 35 and consisting of a disk valve 36 and an orifice passage 37 for controlling a flow of hydraulic fluid generated at the time of a compression stroke, and a check valve 39 provided on the lower chamber 5 side of the third expansion side passage 34 for allowing the hydraulic fluid to flow from the annular space 32 to the inner cylinder 2 and restricting a flow of the hydraulic fluid from the inner cylinder 2 to the annular space 32.

Figure 2:
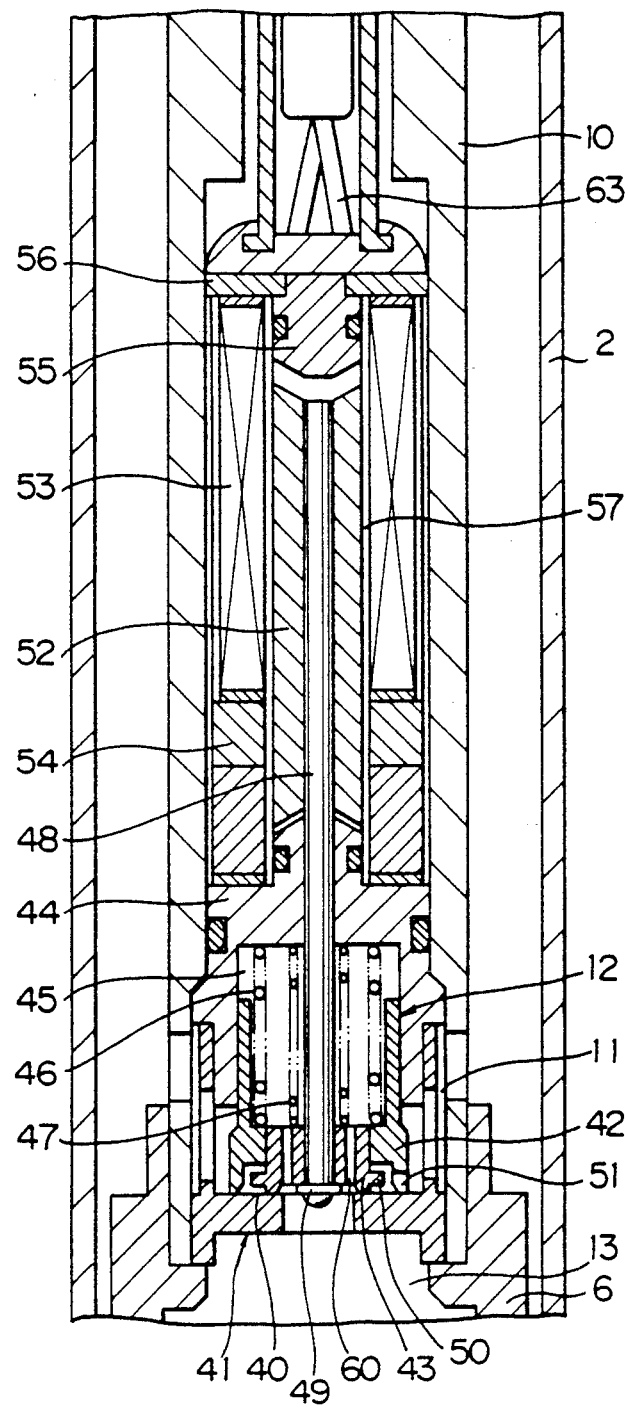
FIG. 2 is an enlarged view of a principal part of the shock absorber of FIG. 1.

Next, the damping force regulating valve 12 (solenoid valve) which is a principal part of the invention will be described in detail with reference to FIG. 2.

The piston rod 10 is formed of a magnetic material, and a valve seat member 41 having a valve seat 40 formed thereon is mounted on a lower side of the piston rod 10. A first valve body 42 and a second valve body 43 are provided within the bypass 13. The first valve body 42 is axially movable relative to the piston rod 10 so as to slide on a support member 44 consisting of a magnetic material and which is mounted within the piston rod 10. And, the second valve body 43 is axially movable relative to the piston rod 10 inside the first valve body 42. The second valve body 43 is concentrically fitted in the first valve body 42. The valve bodies 42, 43 are each seated on the valve seat 40 to normally close off the bypass 13. The first valve body 42 is normally biased toward the valve seat 40 by a first spring member 46 disposed in a space 45 formed by the valve bodies 42, 43 and the support member 44, and the second valve body 43 is likewise normally biased toward the valve seat 40 by a second spring member 47.

A shaft 48 is fitted slidably in the second valve body 43, and a washer 49 is mounted on a lower end of the shaft 48. Thus, the second valve body 43 will rise as the shaft 48 ascends. Further, a flange 50 is formed on an outer periphery of the second valve body 43, and thus when the second valve body 43 is raised by a predetermined amount, the flange 50 interlocks with the first valve body 42 to raise the first valve body 42. An orifice passage 51 is formed in the first valve body 42, and an area of the orifice passage 51 is set to be smaller than an area of the orifice passage 25 of the second expansion side damping force generating mechanism 26 provided in the passage member 8.

The shaft 48 passes through the support member 44 to extend axially upward of the piston rod 10, and a plunger 52 formed of a magnetic material is mounted on its upper portion.

The plunger 52 extends into one solenoid 53 and an annular permanent magnet 54 provided on a lower side thereof. An inner peripheral side of the permanent magnet 54 which faces the plunger 52 serves as an S-pole while the outer peripheral side serves as an N-pole. A base 55 made of a magnetic material is positioned on an upper side of the solenoid 53 by a retainer 56 made of a magnetic material which is mounted on the piston rod 10, and the plunger 52 is restricted to move between the support member 44 and the base 55. A sleeve 57 made of a nonmagnetic material is interposed between the plunger 52 and the solenoid 53 and the permanent magnet 54, and opposite ends of the sleeve 57 are fitted fluid-tightly with the support member 44 and the base 55. A lead wire 63 connected to the solenoid 53 is embedded in resin on an upper surface of the retainer 56 and is connected to a control circuit 58 (FIG. 3) externally of the hydraulic shock absorber 1 through the piston rod 10.

The control circuit 58 is capable of effectively modifying the value of a current fed from a battery 59 (FIG. 3) to the solenoid 53.

A through-hole 60 for keeping the space 45 formed by the valve bodies 42, 43 and the support member 44 and the bypass 13 communicating with each other is formed in the second valve body 43. Hydraulic fluid is introduced into the space 45 by way of the through-hole 60 so as to apply the same pressure as generated in the bypass 13 on opposite end surfaces of the valve bodies 42, 43. Thus, even if the pressure generated in the bypass 13 becomes higher at the time of a compression stroke, the valve bodies 42, 43 are prevented from being opened unnecessarily.

The operation of the aforementioned shock absorber will be described with reference to FIG. 1 to FIG. 4 and FIG. 6.

Figure 6:
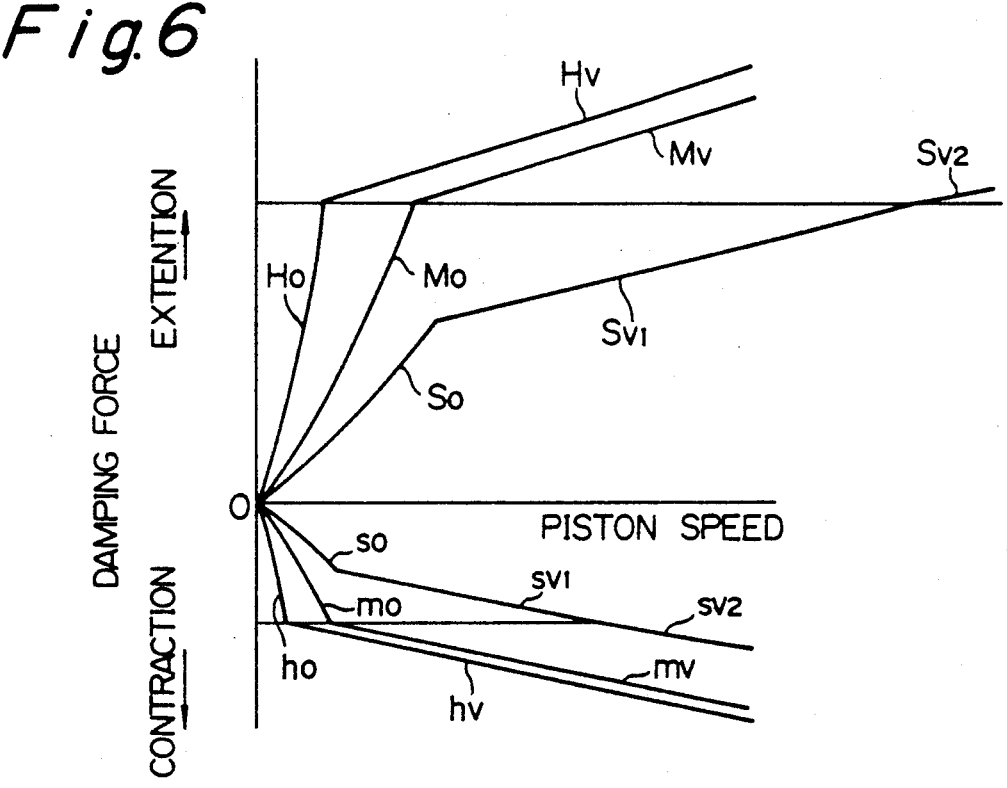
FIG. 6 is a graph showing damping force characteristics of the first embodiment of the hydraulic shock absorber.

First, with the bypass 13 closed off by the valve bodies 42, 43 as shown in FIG. 1, a damping force having characteristics dictated by the orifice passage 17 of the first expansion side damping force generating mechanism 18 provided on the piston 3, and a damping force having characteristics dictated by the disk valve 16 are generated during the expansion stroke of the hydraulic shock absorber 1 (a hard characteristic as indicated by a line Ho-Hv in FIG. 6).

Then, a damping force having characteristics dictated by the orifice passage 17 of the first expansion side damping force generating mechanism 18 of the piston 3 and the orifice passage 37 of the second compression side damping force generating mechanism 38 of the body part mechanism 30, and a damping force made up of damping forces generated by the disk valve 19 of the first compression side damping force generating mechanism 20 of the piston 3 and the disk valve 36 of the second compression side damping force generating mechanism 38 of the body part mechanism 30, are generated during compression stroke (a hard characteristic as indicated by a line ho-hv in FIG. 6). Then, although there would be a shortage of hydraulic fluid in lower chamber 5 when the piston rod 10 extended to displace out of the inner cylinder 2 during the expansion stroke, the check valve 39 provided on the body part mechanism 30 opens and hydraulic fluid in the annular space 32 between the inner and outer cylinders enters the inner cylinder 2 to replenish lower chamber 5.

Figure 3:
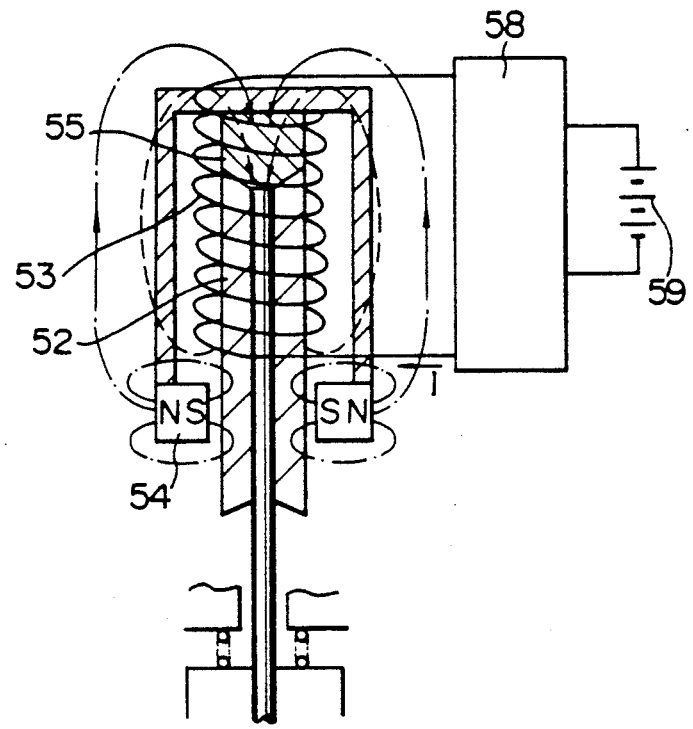
FIG. 3 and FIG. 4 are schematic diagrams illustrating the operation of a damping force regulating valve 12 of the shock absorber shown in FIG. 1.

Next, when a current is supplied to the solenoid 53 from the control circuit 58 in the direction indicated by an arrow I in FIG. 3, the solenoid 53 generates a magnetic field in the direction indicated by a broken line in the figure, which is intensified by a magnetic field generated by the permanent magnet 54 indicated by a one-dot chain line, whereby the plunger 52 is attracted to the base 55. In this case, the value of a current flowing to the solenoid 53 is set to be low by the control circuit 58, and a force generated by the base 55 to attract the plunger 52 raises the second valve body 43 against a biasing force of the second spring member 47 but is insufficient to raise the first valve body 42 any further against a biasing force of the first spring member 46. Accordingly, only the second valve body 43 opens, and the bypass 13 communicates with the upper chamber 4 through the orifice passage 51 formed in the first valve body 42.

At the time of an expansion stroke in such a condition, a damping force is generated having characteristics dependent on the combined areas of the orifice passage 51 formed on the first valve body 42 and the orifice passage 17 of the first expansion side damping force generating mechanism 18 provided on the piston 3, and a damping force is generated having characteristics dictated by the disk valve 16 of the first expansion side damping force generating mechanism 18 provided of the piston 3 (a characteristic as indicated by a line Mo-Mv in FIG. 6). Then, at the time of this expansion stroke, a rise in hydraulic pressure on a downstream side of the first valve body 42 in the bypass 13 is throttled by the orifice passage 51 formed on the first valve body 42 and thus is suppressed low. Therefore, the disk valve 24 of the expansion side damping force generating mechanism 26 in the passage member 8 is not opened, and only a damping force is produced by the disk valve 16 of the first expansion side damping force generating mechanism 18 provided on the piston 3.

At the time of a compression stroke, a damping force is generated having characteristics dependent on the areas of the orifice passage 51, 17 and 37 and a damping force is generated having characteristics dictated by the disk valves 19 and 36 (a medium characteristic as indicated by a line mo-mv in FIG. 6).

Then, when the value of a current to be supplied to the solenoid 53 is increased by the control circuit 58, an attraction force generated by the base becomes large, the first valve body 42 is raised into contact with the base 55 against the biasing forces of the first spring member 46 and the second spring member 47, and both of the valve bodies 42, 43 are raised from the valve seat 40 whereby the bypass 13 is fully opened. When the feed of current is stopped thereafter, the plunger 52 is retained in place by the magnetic field of the permanent magnet 54 and thus the valve bodies 42, 43 are kept in the positions raised from the valve seat 40.

At the time of the expansion stroke in such a condition, a damping force is generated having characteristics dependent on the combined areas of the orifice passage 17 of the first expansion side damping force generating mechanism 18 provided on the piston 3 and the orifice passage 25 of the second expansion side damping force generating mechanism 26 in the passage member 8, and a damping force is generated having characteristics dictated by the disk valve 24 of the second expansion side damping force generating mechanism 26 in the passage member 8. When the speed is further increased, the disk valve 16 of the first expansion side damping force generating mechanism 18 opens to generate a damping force having a soft characteristic indicated by So-$Sv_1$-$Sv_2$ in FIG. 6.

Then, at the time of a compression stoke, a damping force is generated having characteristics dependent on the combined areas of the orifice passage 17 of the first expansion side damping force generating mechanism 18 provided on the piston 3, of the orifice passage 25 of the second expansion side damping force generating mechanism 26 in the passage member 8 and of the orifice passage 37 of the second compression side damping force generating mechanism 38 of the body part mechanism 30. And, a damping force is generated having characteristics dictated by the disk valve 36 of the second compression side damping force generating mechanism 38 of the body part mechanism 30. Further, the disk valve 19 of the first compression side damping force generating mechanism 20 opens, and a soft characteristic indicated by So-$Sv_1$-$Sv_2$ in FIG. 6 is obtained in this process. Then, at the time of this compression stroke, the check valve 27 in the passage member 8 opens under the operation of the piston 3, and hydraulic fluid in the lower chamber 5 flows to the upper chamber 4.

Figure 4:
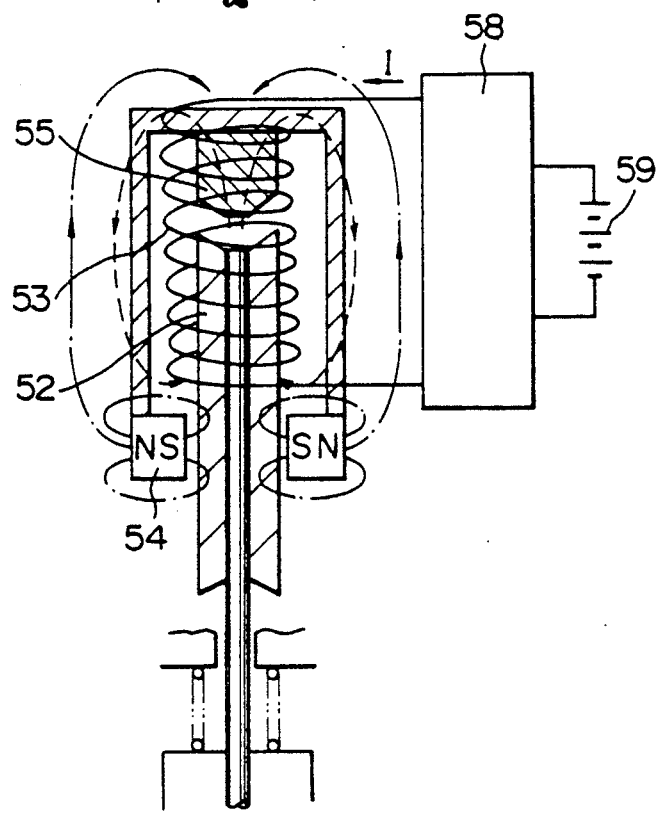

Next, when a current is fed to the solenoid 53 in a direction opposite to that shown in FIG. 4, the solenoid 53 generates a magnetic field in the direction indicated by broken lines, which is negated by the magnetic field generated by the permanent magnet 54 which is indicated by one-dot chain lines. Therefore, biasing forces of the spring members 46, 47 lower the plunger 52, the valve bodies 42, 43 are seated on the valve seat 40 and the bypass 13 is closed off. In this case, because the second valve body 43 and the shaft 48 are slidable relative to one another, the shaft 48 may descend even after the second valve body 43 comes into contact with the valve seat 40. Therefore, the plunger 52 can be brought into contact with or proximite the support member 44. Consequently, the plunger 52 and the support member 44 are attracted to each other in the magnetic field of the permanent magnet 54, and the plunger 52 is retained securely in such a position.

When the current is stopped thereafter, the plunger 52 is retained in position by the magnetic field of the permanent magnet 54, and the valve bodies 42, 43 are kept seated on the valve seat 40.

Figure 5:
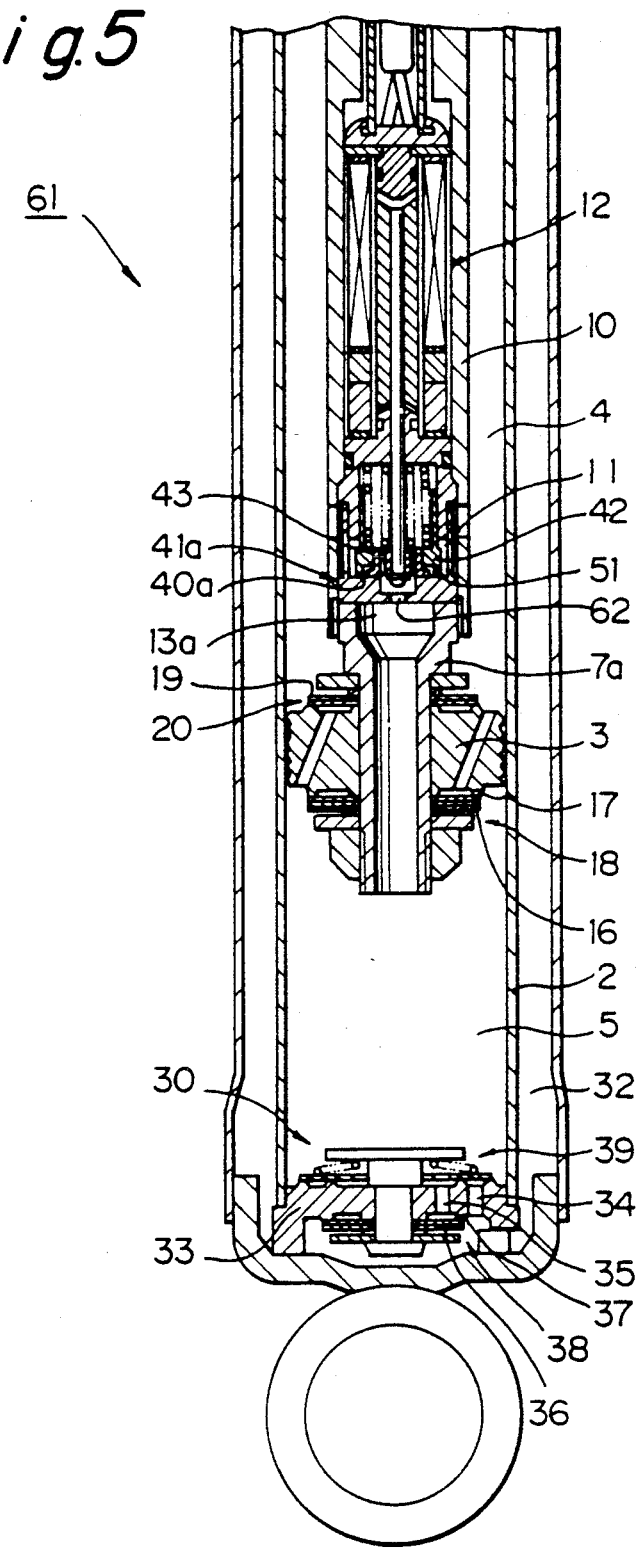
FIG. 5 is a longitudinal sectional view of a second embodiment of a hydraulic shock absorber according to the present invention.

A second embodiment will now be described with reference to FIG. 5. A hydraulic shock absorber 61 of the second embodiment is different from the first embodiment only in the construction of the damping force generating mechanisms in a bypass 13a. Therefore, only different members will be described in detail, wherein like reference characters represent like members and a further description thereof is omitted.

A small-sized cylinder 7a on which the piston 3 is mounted is fixed directly on the piston rod 10, and the bypass 13a is constituted by the interior of the small-sized cylinder 7a and the passage 11 of the piston rod 10. A valve seat member 41a is provided in the bypass 13a, and an orifice passage 62 is formed on the valve seat member 41a. An area of the orifice passage 62 is set to be larger than an area of the orifice passage 51 formed on the first valve body 42.

The operation of the hydraulic shock absorber 61 will now be described. However, because the damping force regulating valve 12 operates as in the case of the above-described first embodiment, a further description thereof will be omitted here.

Figure 7:
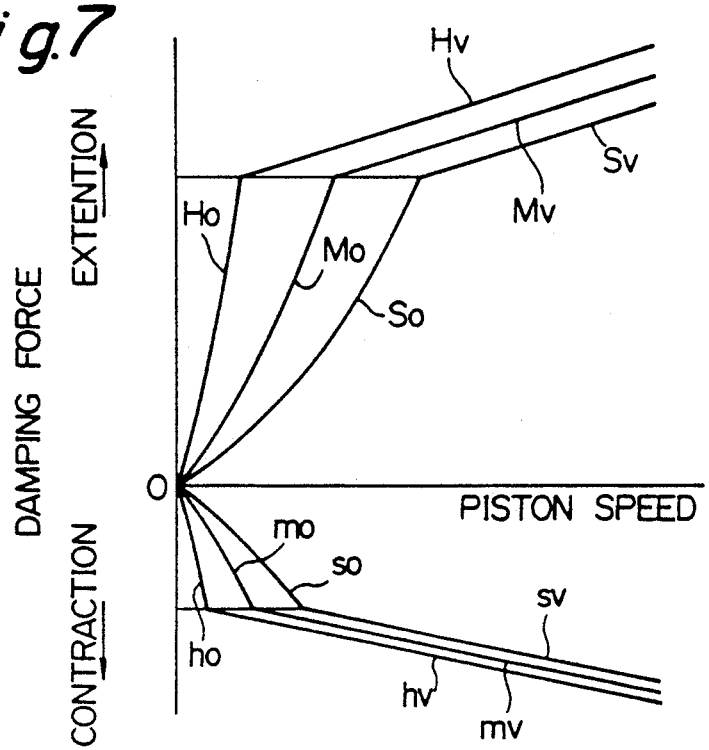
FIG. 7 is a graph showing damping force characteristics of the second embodiment of the hydraulic shock absorber.

At the time of an expansion stroke when the first valve body 42 and the second valve body 43 are seated on a valve seat 40a to close off the bypass 13a, a damping force is generated having characteristics dependent on the area of the orifice passage 17 of the first expansion side damping force generating mechanism 18 provided on the piston 3, and a damping force is generated having characteristics dictated by the disk valve 16 (a hard characteristic indicated by Ho-Hv in FIG. 7).

Then, at the time of a compression stroke, a damping force is generated having characteristics dependent on the combined areas of the orifice passage 17 of the first expansion side damping force generating mechanism 18 of the piston 3 and of the orifice passage 37 of the second compression side damping force generating mechanism 38 of the body part mechanism 30, and a damping force is generated having characteristics dictated by the additive effect of the disk valve 19 of the first compression side damping force generating mechanism 20 of the piston 3 and the disk valve 36 of the second compression side damping force generating mechanism 38 of the body part mechanism 30 (a hard characteristic indicated by ho-hv in FIG. 7).

In this case, when only the second valve body 43 is unseated, a damping force is generated having characteristics dependent on the combined areas of the orifice passage 51 formed on the first valve body 42 and of the orifice passage 17 of the first expansion side damping force generating mechanism 18 provided on the piston 3, and a damping force is generated having characteristics dictated by the disk valve 16 of the first expansion side damping force generating mechanism 18 (a medium characteristic indicated by Mo-Mv in FIG. 7).

Then, at the time of a compression stroke, a damping force is generated having characteristics dependent on the combined areas of the orifice passage 51 formed on the first valve body 42, of the orifice passage 17 of the first expansion side damping force generating mechanism 18 provided on the piston 3, and of the orifice passage 37 of the second compression side damping force generating mechanism 38 of the body part mechanism 30, and a damping force is generated having characteristics dictated by the disk valve 19 of the first compression side damping force generating mechanism 20 of the piston 3 and the disk valve 36 of the second compression side damping force generating mechanism 38 of the body part mechanism 30 (a medium characteristic indicated by mo-mv in FIG. 7).

Next, when the first valve body 42 and the second valve body 43 are both opened, a damping force is generated having characteristics dependent on the combined areas of the orifice passage 62 formed on the valve seat member 41a and of the orifice passage 17 of the first expansion side damping force generating mechanism 18 provided on the piston 3, and a damping force is generated having characteristics dictated by the disk valve 16 of the first expansion side damping force generating mechanism 18 (a soft characteristic indicated by So-Sv in FIG. 7).

Then, at the time of a compression stroke, a damping force is generated having characteristics dependent on the combined areas of the orifice passage 62 formed on the valve seat member 41a, of the orifice passage 17 of the first expansion side damping force generating mechanism 18 provided on the piston 3 and of the orifice passage 37 of the second compression side damping force generating mechanism 38 of the body part mechanism 30, and a damping force is generated having characteristics dictated by the disk valve 16 of the first compression side damping force generating mechanism 20 of the piston 3 and the disk valve 36 of the second compression side damping force generating mechanism 38 of the body part mechanism 30 (a soft characteristic indicated by so-sv in FIG. 7).

In each embodiment described above, the damping force regulating valve of the invention is used for controlling the opening and closing of the bypass 13, 13a provided around the piston 3. However, the damping force regulating valve of the invention may be applied otherwise, for example, to regulate a damping force by selectively controlling the opening and closing of passages of the body part mechanism (as disclosed, for example, in the aforementioned Japanese Utility Model Examined Publication No. 59-22359) and the like.

Further, in each embodiment, the invention employs the solenoid valve to attain energy-savings by moving the plunger and holding the plunger 52 at the uppermost and lowermost positions without the need for feeding current to the solenoid 53 owing to the use of the permanent magnet 54; however, the invention is not necessarily limited thereto, and a solenoid valve for moving the plunger and maintaining the plunger in position under a constant current feed may also be employed.

Furthermore, in each embodiment described above, the two valve bodies 42, 43 are provided in the bypass 13 or 13a, and the valve bodies 42, 43 are each controlled to provide three damping force characteristics. However, more than three damping force characteristics may also be produced by increasing the number of valve bodies; or the damping force characteristics may be produced by increasing the number of bypasses and controlling the valve bodies provided on each bypass with a respective solenoid. In this case, a damping force generating mechanism consisting of a disk valve exhibiting different characteristics will be provided over each bypass, and by operating the valve bodies successively, various damping force characteristics may be obtained.

Still further, in the damping force regulating valve 12 of the above-described embodiments, the inside second valve body 43 opens earlier than the outside first valve body 42. However, it is also possible for the outside valve body to open first, and thereafter the inside valve body is raised.

Further, in the damping force regulating valve 12 of the embodiments described above, the first valve body is raised by the flange provided on the second valve body. However, an engaging portion such as flange or the like may be formed on a lower end of the shaft 48 so as to provide a clearance between one valve body and the flange and opening the one valve body after another valve body is first opened by the flange.

As described in detail above, the invention comprises biasing the valve bodies toward the valve seat by the spring members having different resiliences which are provided on each of the valve bodies for opening and closing one of the passages, mounting the valve bodies on the plunger moved by a force corresponding to the value of a current fed to the solenoid, operating the valve bodies by controlling the current value, and generating a damping force produced by the damping force generating mechanisms for controlling the flow of a hydraulic fluid in the passage opened by the valve bodies, whereby in a damping force adjusting hydraulic shock absorber using a solenoid valve, more than two damping force characteristics can be smoothly transferred.

Thus, the damping force may be finely adjusted, and an optimal damping force according to road conditions is obtainable, therefore comfort and a steering stability can be enhanced.

What is claimed is:

1. A hydraulic shock absorber comprising:
   a cylinder;
   a piston slidably fitted within said cylinder and partitioning said cylinder into two chambers;
   a damping force generating mechanism defining a plurality of passages along which hydraulic fluid may flow between said chambers, and regulating means for regulating the flow of hydraulic fluid through said passages as said piston is slid in said cylinder so as to generate a damping force; and
   damping force regulating valve means for selectively opening and closing one of said passages to adjust the damping force,
   said damping force regulating valve means including a valve seat member defining a valve seat thereon,
   a plurality of valve bodies movable between respective first positions at which said valve bodies are respectively discretely seated on said valve seat and block said one of the passages and respective second positions at which said valve bodies are respectively located off of said valve seat and open said one of the passages,
   spring means connected to each of said valve bodies for normally biasing said valve bodies to said first positions thereof at which the valve bodies are seated on said valve seat,
   a plunger comprising magnetic material and axially slidable in the valve means,
   said valve bodies including first and second valve bodies movable in the axial direction of said plunger between said first and second positions, said first valve body defining an orifice therethrough located in a path extending through said one of said passages, and said second valve body interposed between said orifice and an end of said one of said passages when in the first position thereof, said second valve body engaged with said plunger and configured to engage said first valve body when moved in the axial direction of said plunger off of said valve seat by a predetermined amount, and
   solenoid means for selectively moving said second valve body in the axial direction of said plunger by more than said predetermined amount to successively move said second and said first valve bodies from the first to the second positions thereof,
   said solenoid means including a solenoid into which the magnetic material of said plunger extends, said solenoid moving said plunger axially under a force corresponding to the magnitude of current supplied thereto.

2. A hydraulic shock absorber according to claim 1, wherein said second valve body is concentrically fitted in said first valve body, and said spring means includes first and second spring members connected to said valve bodies, respectively.

3. A hydraulic shock absorber according to claim 1, wherein said second valve body includes a flange which interlocks with the first valve body when the second valve body is moved from the valve seat by said predetermined amount.

4. A hydraulic shock absorber according to claim 1, and further comprising a disk valve disposed in said one of the passages, said disk valve defining an orifice spaced from said orifice of the first valve body.

5. A hydraulic shock absorber according to claim 1, and further comprising valve structure, disposed in said one of the passages, defining an orifice spaced from said orifice of the first valve body.

* * * * *

UNITED STATES PATENT AND TRADEMARK OFFICE
CERTIFICATE OF CORRECTION

PATENT NO. : 5,064,032

DATED : November 12, 1991

INVENTOR(S) : Masahiro ASHIBA

It is certified that error appears in the above-identified patent and that said Letters Patent is hereby corrected as shown below:

On the Abstract page, the filing date (item [22]) of "March 2, 1990" has been changed to --March 20, 1990--.

Signed and Sealed this

Seventh Day of September, 1993

*Attest:*

BRUCE LEHMAN

*Attesting Officer*       *Commissioner of Patents and Trademarks*